United States Patent
Deng et al.

(10) Patent No.: US 11,110,881 B1
(45) Date of Patent: Sep. 7, 2021

(54) SIDE AIRBAG ASSEMBLY

(71) Applicant: Ford Global Technologies, LLC, Dearborn, MI (US)

(72) Inventors: Zhibing Deng, Northville, MI (US); Deepak Patel, Canton, MI (US); Joseph E. Abramczyk, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/019,442

(22) Filed: Sep. 14, 2020

(51) Int. Cl.
*B60R 21/207* (2006.01)
*B60R 21/231* (2011.01)
*B60R 21/16* (2006.01)
*B60R 21/2334* (2011.01)
*B60R 21/02* (2006.01)

(52) U.S. Cl.
CPC ........ *B60R 21/207* (2013.01); *B60R 21/2334* (2013.01); *B60R 21/23138* (2013.01); *B60R 2021/0273* (2013.01); *B60R 2021/161* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 5,492,361 A * | 2/1996 | Kim | B60R 21/02 280/730.1 |
| 5,730,458 A * | 3/1998 | Byon | B60R 19/00 280/730.2 |
| 7,681,907 B2 | 3/2010 | Svenbrant et al. | |
| 7,717,459 B2 | 5/2010 | Bostrom et al. | |
| 9,937,890 B2 | 4/2018 | Wipasuramonton et al. | |
| 10,272,865 B2 * | 4/2019 | Nagasawa | B60N 2/753 |
| 10,543,800 B2 | 1/2020 | Kwon | |
| 10,569,732 B2 * | 2/2020 | Nagasawa | B60R 21/207 |
| 10,814,818 B2 * | 10/2020 | Dry | B60R 21/217 |
| 2019/0106077 A1 * | 4/2019 | Dry | B60R 21/215 |

FOREIGN PATENT DOCUMENTS

DE 102019116567 A1 * 12/2019 ......... B60N 2/42727

* cited by examiner

*Primary Examiner* — Faye M Fleming
(74) *Attorney, Agent, or Firm* — Frank A. MacKenzie; Bejin Bieneman PLC

(57) ABSTRACT

A restraint system includes a seat defining a lateral axis and an airbag housing supported by the seat. The airbag housing includes a first arm and a second arm. The first arm is rotatable relative to the seat about a rotational axis generally parallel to the lateral axis, and the second arm is fixed relative to the seat. An airbag is disposed between the first arm and the second arm. The airbag is attached to one of the first arm or the second arm.

19 Claims, 6 Drawing Sheets

SIDE AIRBAG ASSEMBLY

BACKGROUND

Vehicles are typically equipped with airbags. In the event of an impact, inflators activate and provide inflation medium to the airbags, and the airbags pressurize and act as supplemental restraints for occupants during the impact. The airbags are located at various fixed positions in passenger cabins of vehicles. Vehicles typically include a driver airbag mounted in the steering wheel, a passenger airbag mounted in the top of the dash in a vehicle-forward direction from the front passenger seat, and side curtain airbags mounted in the roof rails above the doors.

DETAILED DESCRIPTION

Figure 1:
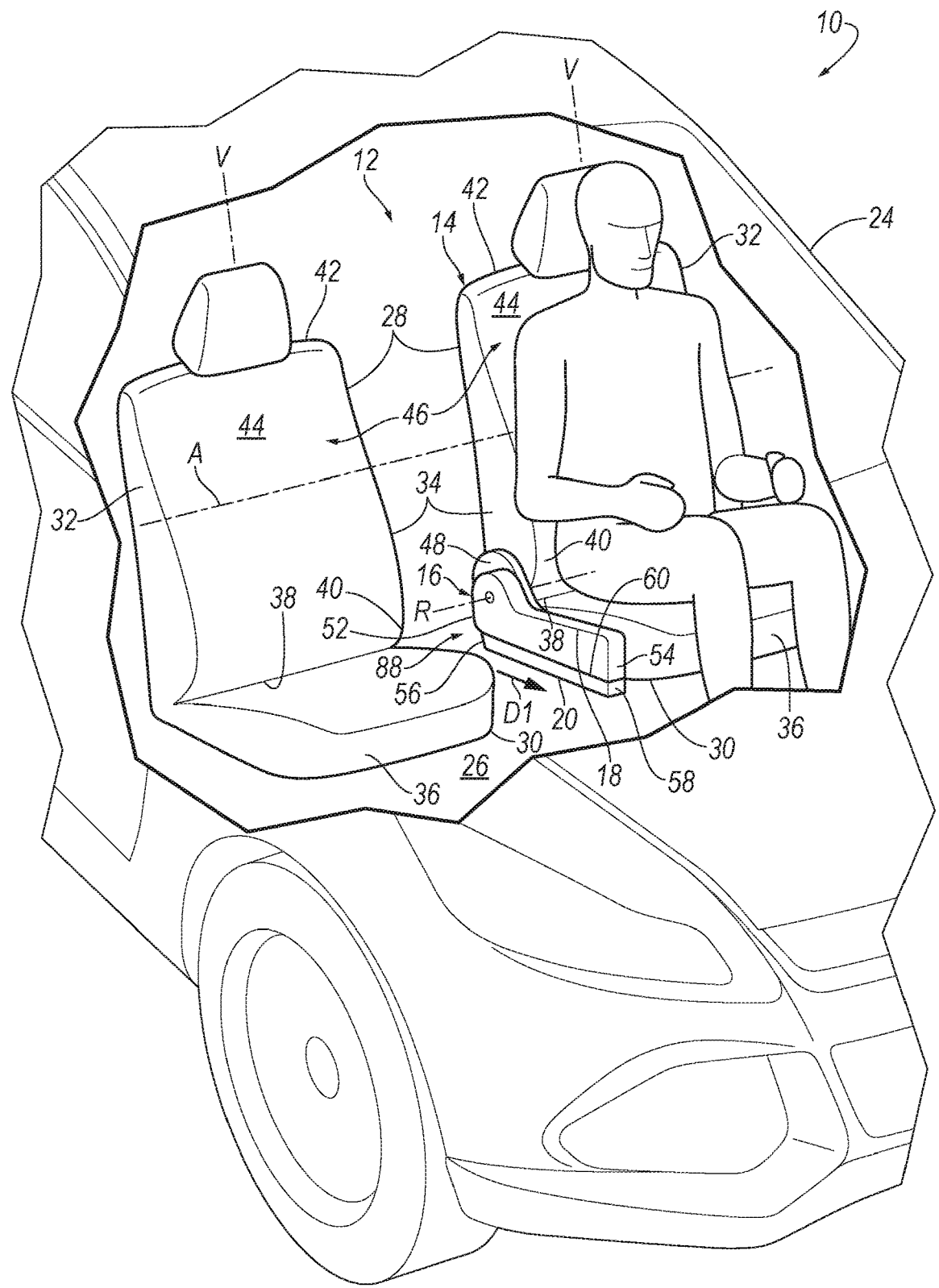
FIG. 1 is a perspective view of an example vehicle including a seat supporting an airbag in an uninflated position.

A restraint system includes a seat defining a lateral axis. An airbag housing is supported by the seat. The airbag housing includes a first arm and a second arm. The first arm is rotatable relative to the seat about a rotational axis generally parallel to the lateral axis, and the second arm is fixed relative to the seat. An airbag is disposed between the first arm and the second arm. The airbag is attached to one of the first arm or the second arm.

The restraint system may include a panel extending from the first arm to the second arm when the airbag is in an inflated position.

The airbag in the inflated position may be disposed between the panel and the seat.

The panel may be attached to the first arm and the second arm. The panel may be under tension between the first and second arms when the airbag is in the inflated position.

The panel may be a reaction surface for the airbag in the inflated position.

The panel may be fabric.

The panel may be uninflatable.

The airbag may include a base attached to the first arm to move as a unit with the first arm.

The first arm and the second arm may be connected to each other along a weakened joint spaced from the rotational axis.

The weakened joint may be designed to break when the airbag is inflated.

The first arm may be rotatable from an undeployed position to a deployed position as a result of the airbag inflating.

The first arm may extend along the second arm in the undeployed position, and the first arm may extend transverse to the second arm in the deployed position.

The first arm and the seat may lock with each other in a fixed position when the first arm is in the deployed position.

The first arm may include a tongue and the seat may include a slot. The tongue of the first arm may be disposed in the slot of the seat when the first arm and the seat are locked with each other in the fixed position.

The seat may include a seat bottom, a seatback supported by the seat bottom, and a side shield extending along the seatback and the seat bottom. The slot may be disposed on the side shield.

The restraint system may include an inflator in fluid communication with the airbag. The inflator may be fixed to the second arm of the housing.

The seat may include a seatback defining an occupant seating area. The airbag and the first arm may be adjacent the seatback when the airbag is in an inflated position, and the airbag may extend from the first arm along the occupant seating area in the inflated position.

The airbag in an inflated position may be spaced from the other of the first arm or the second arm.

The seat may include a seat bottom and a seatback supported by the seat bottom. The second arm may be fixed to one of the seatback or the seat bottom.

With reference to the Figures, wherein like numerals indicate like parts throughout the several views, a vehicle 10 is generally shown. The vehicle 10 includes a restraint system 12 having a seat 14 defining a lateral axis A and an airbag housing 16 supported by the seat 14. The airbag housing 16 includes a first arm 18 and a second arm 20. The first arm 18 is rotatable relative to the seat 14 about a rotational axis R generally parallel to the lateral axis A, and the second arm 20 is fixed relative to the seat 14. An airbag 22 is disposed between the first arm 18 and the second arm 20. The airbag 22 is attached to one of the first arm 18 or the second arm 20.

Figure 2:
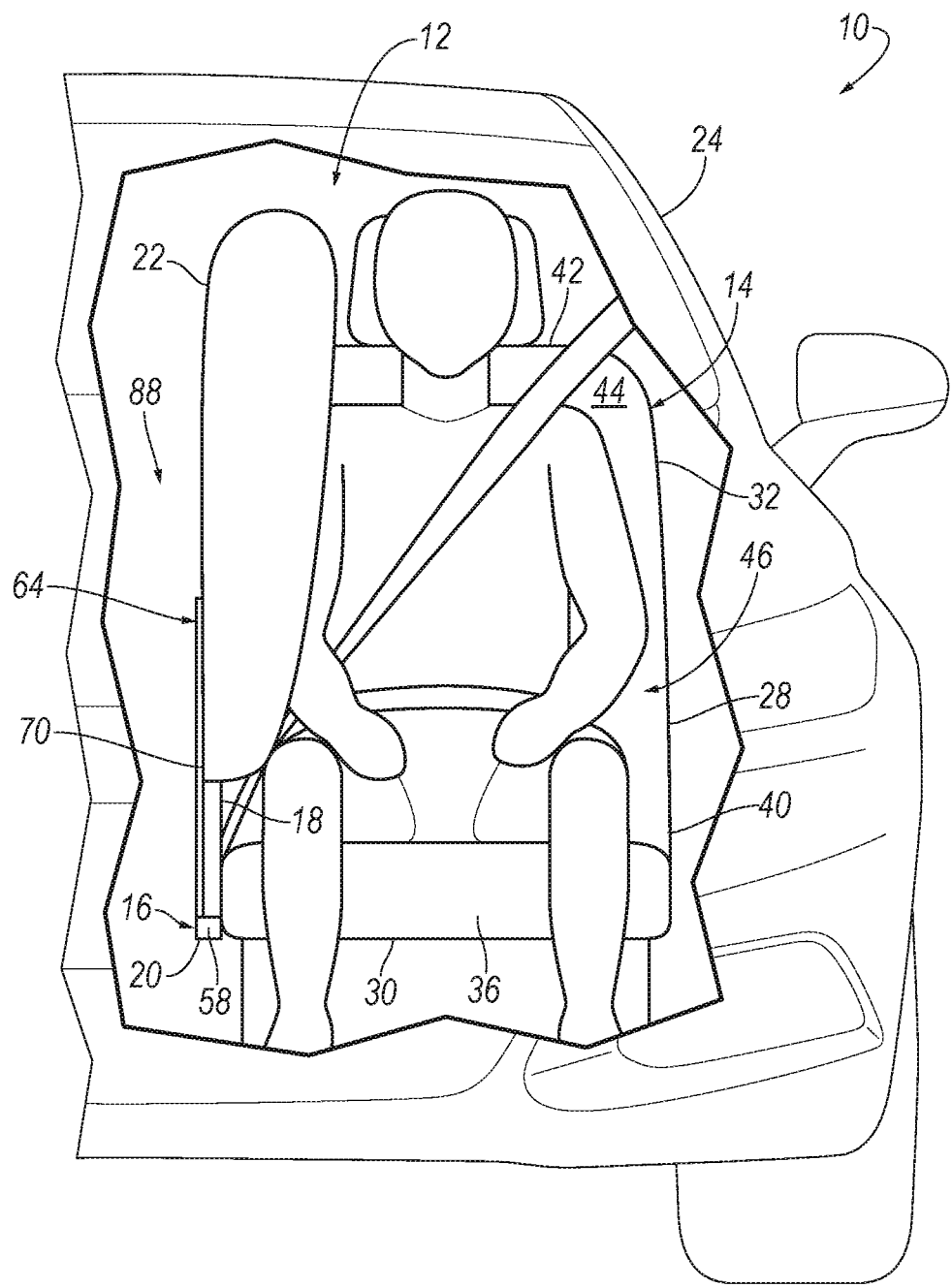
FIG. 2 is a front view of the seat with the airbag in the inflated position.
Figure 3:
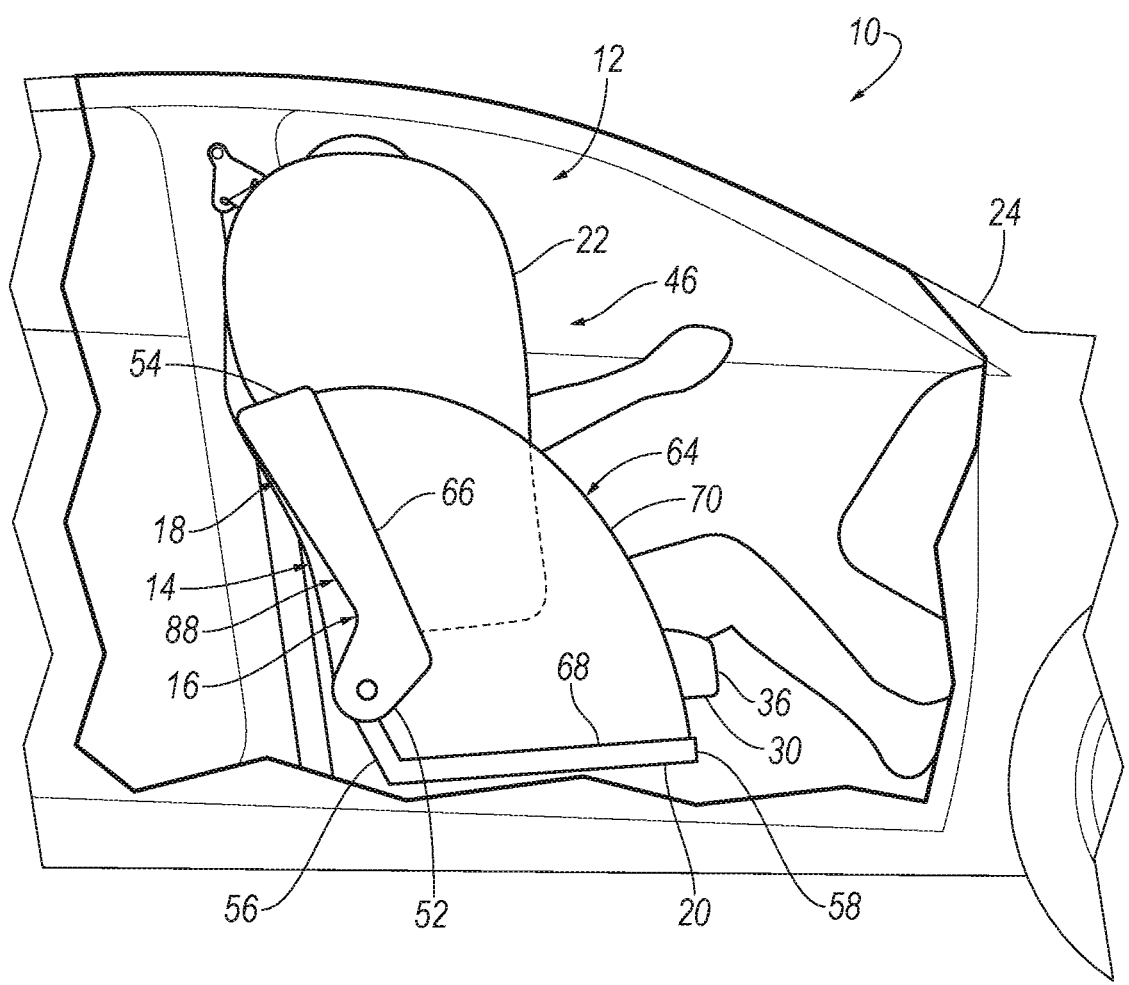
FIG. 3 is a side view of the seat with the airbag in the inflated position.
Figure 4A:
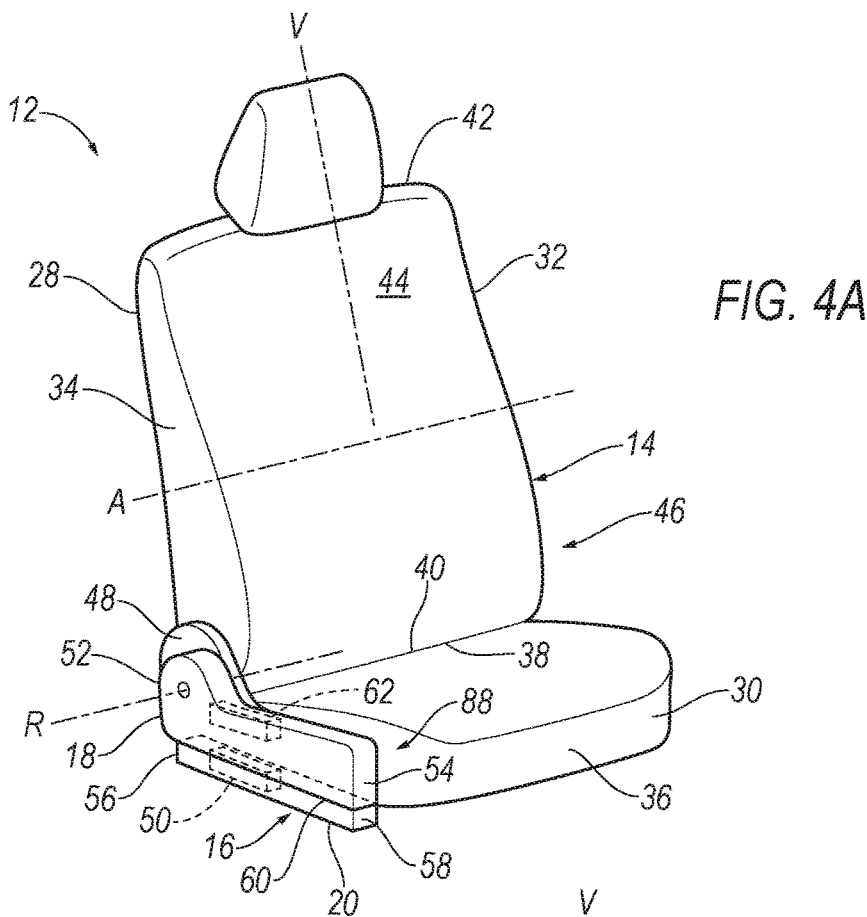
FIG. 4A is a perspective view of an example airbag housing having a first arm rotatable relative to the seat and a second arm mounted to a seat bottom of the seat and the airbag in the uninflated position.

The vehicle 10 may lack components, e.g., a center console, alongside the seat 14, e.g., in order to allow occupants to move within the vehicle 10. In other words, the vehicle 10 may lack a reaction surface alongside the seat 14 for the airbag 22. During a vehicle impact, the airbag 22 may be inflated from an uninflated position, as shown in FIGS. 1, 4A, and 5A, to an inflated position, as shown in FIGS. 2, 3, 4B, 5B, and 6. During the vehicle impact, an occupant of the seat 14 may be forced into the airbag 22 in the inflated position. The airbag 22 may provide coverage so as to control the kinematics of the occupant, e.g., a torso of the occupant. By being attached to one of the first arm 18 or the second arm 20, the airbag 22 may increase the likelihood that the airbag 22 provides coverage to control the kinematics of the occupant regardless of whether another component is adjacent to the seat 14 to provide a reaction surface for the airbag 22.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a body 24 defining a passenger cabin (not numbered) to house occupants, if any, of the vehicle 10. The body 24 may include a roof (not numbered) and a floor 26 with the roof defining an upper boundary of the passenger cabin and the floor 26 defining a lower boundary of the passenger cabin. The body 24 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat, and/or one or more of the seats 14 may be at the rear end of the passenger cabin, i.e., a rear seat.

With reference to the Figures, each seat 14 may include a seatback 28 and a seat bottom 30. The seatback 28 may be supported by the seat bottom 30 and may be stationary or movable relative to the seat bottom 30. The seatback 28 and the seat bottom 30 may be adjustable in multiple degrees of freedom. Specifically, the seatback 28 and the seat bottom 30 may themselves be adjustable, in other words, adjustable components within the seatback 28 and/or the seat bottom 30 may be adjustable relative to each other.

Each seat 14 defines a lateral axis A and a vertical axis V transverse to the lateral axis A. Each seat includes two sides 32, 34 spaced from each other along the lateral axis A. The sides 32, 34 extend along the seatback 28 and the seat bottom 30. The sides 32, 34 may support an occupant laterally relative to the seat 14. As one example, one of the sides 32, 34 may be an outboard side 32, and the other of the sides 32, 34 may be an inboard side 34 (with "inboard" and "outboard" referring to the relative position of the sides in a cross-vehicle direction). In such an example, the outboard side 32 is between the inboard side 34 of the seat 14 and the adjacent door.

As shown in the Figures, the seat bottom 30 includes a front end 36 and a back end 38. The seatback 28 is at the back end 38. The front end 36 is spaced from the back end 38 and the seatback 28. The seatback 28 extends across the seat bottom 30, e.g., from one side 32 of the seat 14 to the other side 34 of the seat 14, at the back end 38.

The seatback 28 includes a bottom 40 at the seat bottom 30 and a top 42 spaced from the bottom 40 and the seat bottom 30 along the vertical axis V of the seat 14. For example, the top 42 may support a head restraint (not numbered), i.e., be disposed between the head restraint and the seat bottom 30. The seatback 28 includes a front 44 that faces an occupant seating area 46 of the seat 14. The occupant seating area 46 is the area occupied by an occupant when seated on the seat bottom 30.

Each seat 14 may include a side shield 48 disposed on the inboard side 34 of the seat 14, as shown in the Figures. The side shield 48 may extend along the seat bottom 30 and the seatback 28. The side shield 48 may partially cover the seat bottom 30 and the seatback 28. For example, the side shield 48 may present a class-A surface, e.g., a finished surface exposed to view by a customer and free of unaesthetic blemishes and defects. The side shield 48 may be of any suitable type and construction, e.g., a plastic, a composite, etc.

With continued reference to FIG. 1, each seat 14 defines a seat-forward direction D1. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. As another example, the seat bottom 30 may extend from the seatback 28 in the seat-forward direction D1.

Each seat 14 is supported by the floor 26, as shown in FIG. 1. Each seat 14 may slide relative to the floor 26, e.g., in the seat-forward direction D1 or a seat-backward direction. In such an example, the seat 14 may be supported on a seat track (not shown) to allow the seat 14 to move in the seat-forward direction D1 or the seat-backward direction. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 26. In this situation, the seat 14 may be immovable relative to the floor 26.

The restraint system 12 includes a side airbag assembly 88, which includes the airbag housing 16, the airbag 22, and an inflator 50, as shown in FIGS. 4A and 5A. The seat 14 may support side airbag assembly 88, and specifically, may support the airbag 22 when the airbag 22 is in the inflated position. The side airbag assembly 88 may be mounted to the seat 14, as discussed further below. The side airbag assembly 88 may be external to a covering of the seat 14. In other words, the side airbag assembly 88 may be disposed alongside the seat 14, as shown in the Figures. More than one side airbag assembly 88 may be supported on the seat 14. For example, one side airbag assembly 88 may be supported on the inboard side 34 of the seat 14, as shown in the Figures. As another example, one side airbag assembly 88 may be supported on each side 32, 34 of the seat 14.

The airbag housing 16 houses the airbag 22 in the uninflated position. In other words, the airbag 22 is enclosed between the first arm 18 and the second arm 20 in the uninflated position. The airbag 22 may be folded and/or rolled in the airbag housing 16 when the airbag 22 is in the uninflated position. As described below, the airbag 22 ruptures the airbag housing 16 and expands from and is supported by the airbag housing 16 as the airbag 22 inflates from the uninflated position to the inflated position. The housing may be of any suitable type and construction, e.g., a polymer, a composite, a combination of rigid materials, etc.

The airbag housing 16 includes two arms 18, 20. One of the arms 18, 20 is rotatable relative to the seat 14 and may be referred to as the first arm 18, and the other of the arms 18, 20 is fixed relative to the seat 14 and may be referred to as the second arm 20. The airbag housing 16 may include a joint (not numbered) between the first arm 18 and the second arm 20. The first arm 18 meets the second arm 20 at the joint. The joint may be a rotatable joint, e.g., a hinge. Specifically, the first and second arms 18, 20 are rotatably connected to each other at the joint. In such an example, the joint may define the rotational axis R. As set forth above, the rotational axis R is generally parallel to the lateral axis A of the seat 14. In this context, "generally" means that the rotational axis R supports rotation of the first arm 18 in a plane that extends generally next to the shoulder and hip on one side of the occupant, e.g., inboard of the occupant seating area 46, even if the rotational axis R deviates from parallel.

Figure 4B:
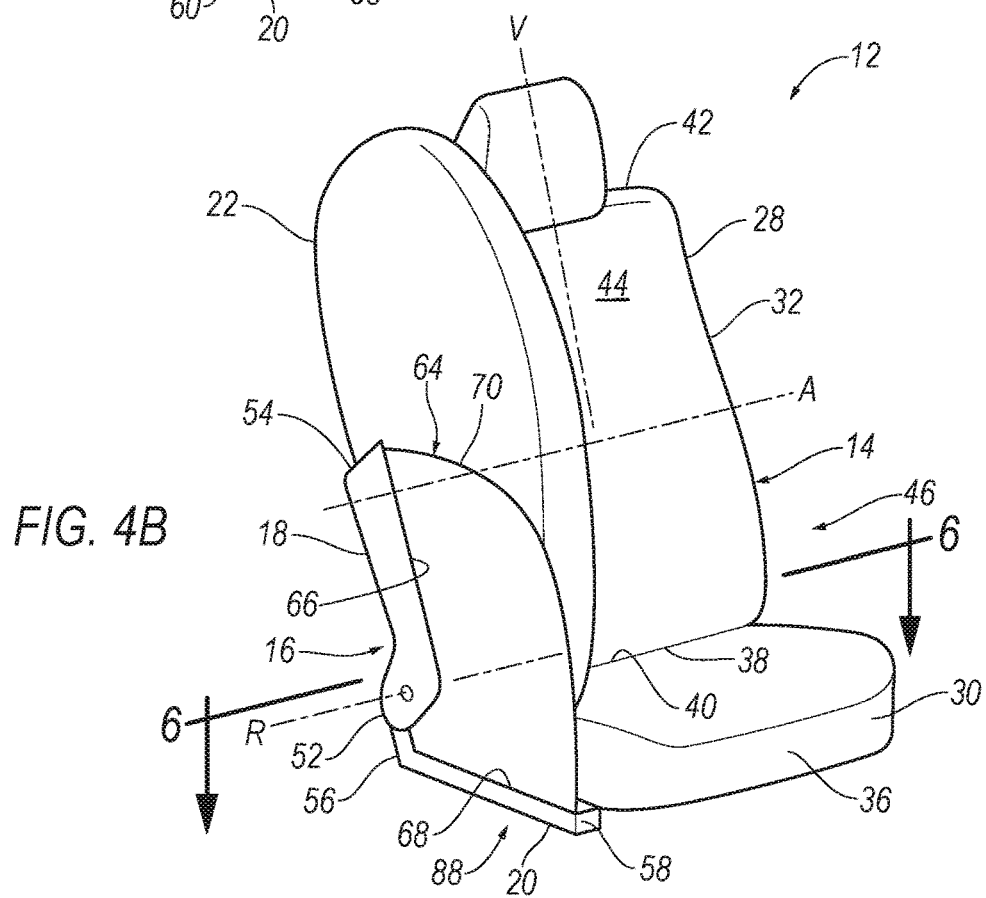
FIG. 4B is a perspective view of the example airbag housing of FIG. 4A with the first arm rotated into a deployed position and the airbag in the inflated position.
Figure 5A:
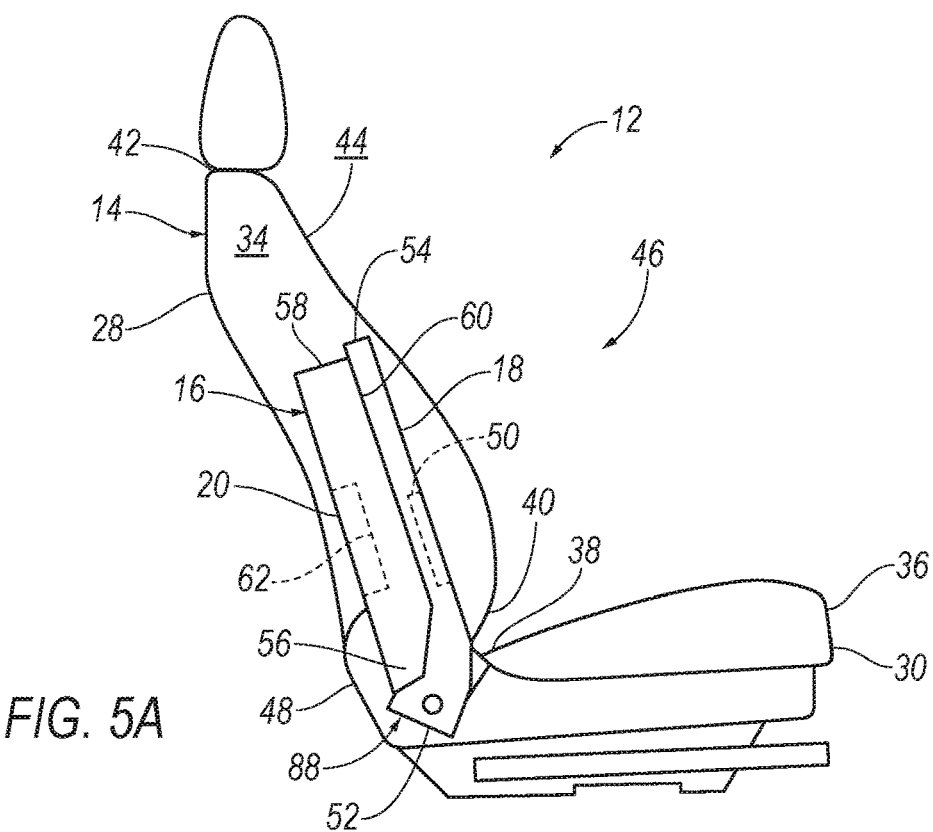
FIG. 5A is a side view of another example airbag housing having the second arm mounted to a seatback and the airbag in the uninflated position.
Figure 5B:
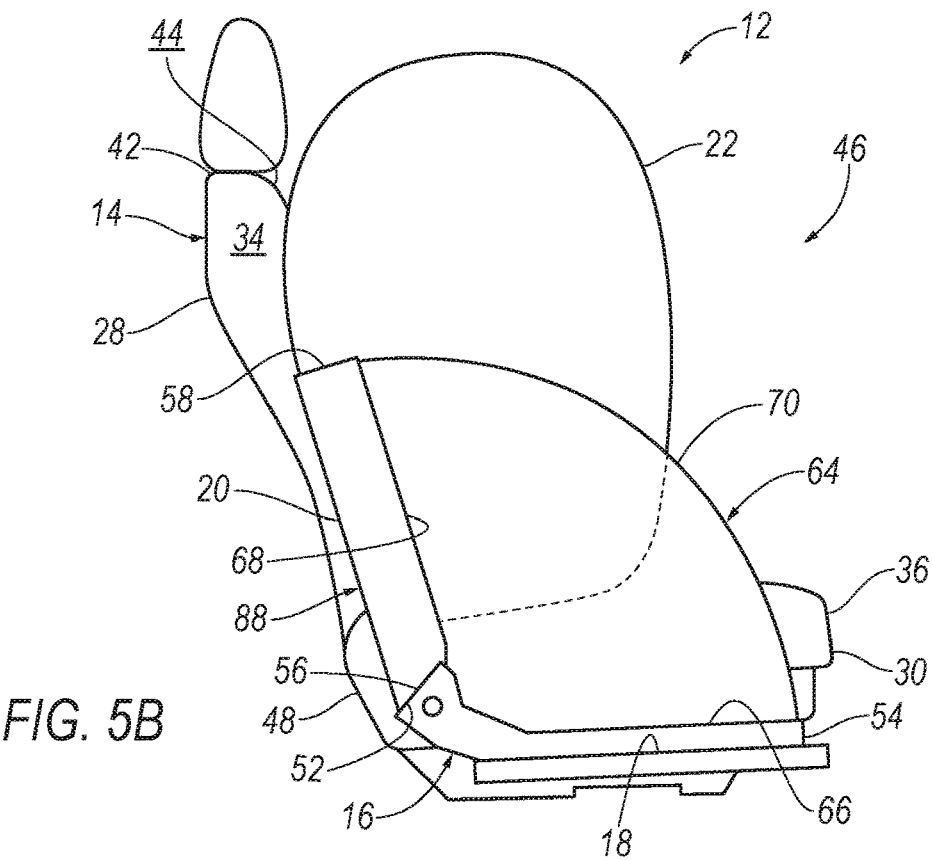
FIG. 5B is a side view of the example airbag housing of FIG. 5A with the first arm rotated into the deployed position and the airbag in the inflated position.

The second arm 20 is mounted to the one of the seatback 28, as shown in FIGS. 5A and 5B, or the seat bottom 30, as shown in FIGS. 4A and 4B. Specifically, the second arm 20 is fixed relative to one of the seatback 28 or the seat bottom 30. The second arm 20, for example, may include locating elements, fasteners, etc., that engage the one of the seatback 28 or seat bottom 30. Additionally, or alternatively, fasteners may engage the second arm 20 and the one of the seatback 28 or seat bottom 30 to mount the second arm 20 to the one of the seatback 28 or the seat bottom 30.

With reference to FIGS. 4A-5B, the second arm 20 includes a proximal end 56 and a distal end 58 spaced from the proximal end 56. The joint may be disposed at the proximal end 56 of the second arm 20. That is, the distal end 58 of the second arm 20 is spaced from the rotational axis R. The second arm 20 is elongated from the proximal end 56 to the distal end 58. In other words, the longest dimension of the second arm 20 is from the proximal end 56 to the distal end 58. For example, when the second arm 20 is mounted to the seatback 28, the second arm 20 is elongated along the seatback 28, as shown in FIGS. 4A and 4B. Alternatively, when the second arm 20 is mounted to the seat bottom 30, the second arm 20 is elongated along the seat bottom 30, as shown in FIGS. 5A and 5B.

The first arm 18 includes a proximal end 52 and a distal end 54 spaced from the proximal end 52. The joint may be disposed at the proximal end 52 of the first arm 18. In other words, the proximal ends 52, 56 of the first and second arms 18, 20 may be rotatably connected to each other via the joint. The distal end 54 of the first arm 18 is spaced from the rotational axis R. The distal end 54 of the first arm 18 is rotatable about the rotational axis R. The first arm 18 is elongated from the proximal end 52 to the distal end 54. In other words, the longest dimension of the first arm 18 is from the proximal end 52 to the distal end 54. The first and second arms 18, 20 may be elongated a same amount. For example, the ends 52, 54 of the first arm 18 may be spaced from each other by a same amount as the ends 56, 58 of the second arm 20. In other words, the first arm 18 and the second arm 20 may have a same length.

The first arm 18 is rotatable relative to the second arm 20, i.e., the seat 14, from an undeployed position, as shown in FIGS. 1, 4A, and 5A, to a deployed position, as shown in FIGS. 2, 3, 4B and 5B, when the airbag 22 inflates. In the undeployed position, the first arm 18 is elongated along the second arm 20. In the undeployed position, the first arm 18 and the second arm 20 define a cavity (not shown) therebetween that houses the airbag 22. As the airbag 22 inflates toward the inflated position, the first arm 18 rotates about the rotational axis R thus moving the first arm 18 to the deployed position. That is, inflation of the airbag 22 forces the first arm 18 to rotate to the deployed position.

In the undeployed position, the first and second arms 18, 20 are connected to each other at a weakened joint 60 spaced from the rotational axis R, as shown in FIGS. 4A and 5A. For example, the weakened joint may be at the distal end 54 of the first arm 18 and the distal end 58 of the second arm 20. Said differently, the distal end 54 of the first arm 18 may be connected to the distal end 58 of the second arm 20 via the weakened joint 60 when the first arm 18 is in the undeployed position. The weakened joint 60 is designed to break when the airbag 22 is inflated, i.e., the force of the inflation of the airbag 22 breaks the weakened joint 60 and allows the airbag 22 to exit the airbag housing 16 to the inflated position. When the inflation of the airbag 22 breaks the weakened joint 60, the first arm 18 is free to rotate about the rotational axis R to the deployed position. The weakened joint 60 may be, for example, perforated lines, lines of thinned material, etc.

In the deployed position, the first arm 18 is elongated transverse to the second arm 20. Specifically, the first arm 18 in the deployed position is elongated along the other of the seatback 28 or the seat bottom 30. For example, when the second arm 20 is mounted to the seat bottom 30, the first arm 18 is elongated along the seatback 28 in the deployed position, as shown in FIGS. 3 and 4B. In such an example, the first arm 18 is disposed adjacent to the seatback 28 in the deployed position. Alternatively, when the second arm 20 is mounted to the seatback 28, the first arm 18 is elongated along the seat bottom 30, i.e., in the seat-forward direction D1, in the deployed position, as shown in FIG. 5B. In such an example, the first arm 18 is disposed adjacent to the seat bottom 30 in the deployed position.

Figure 6:
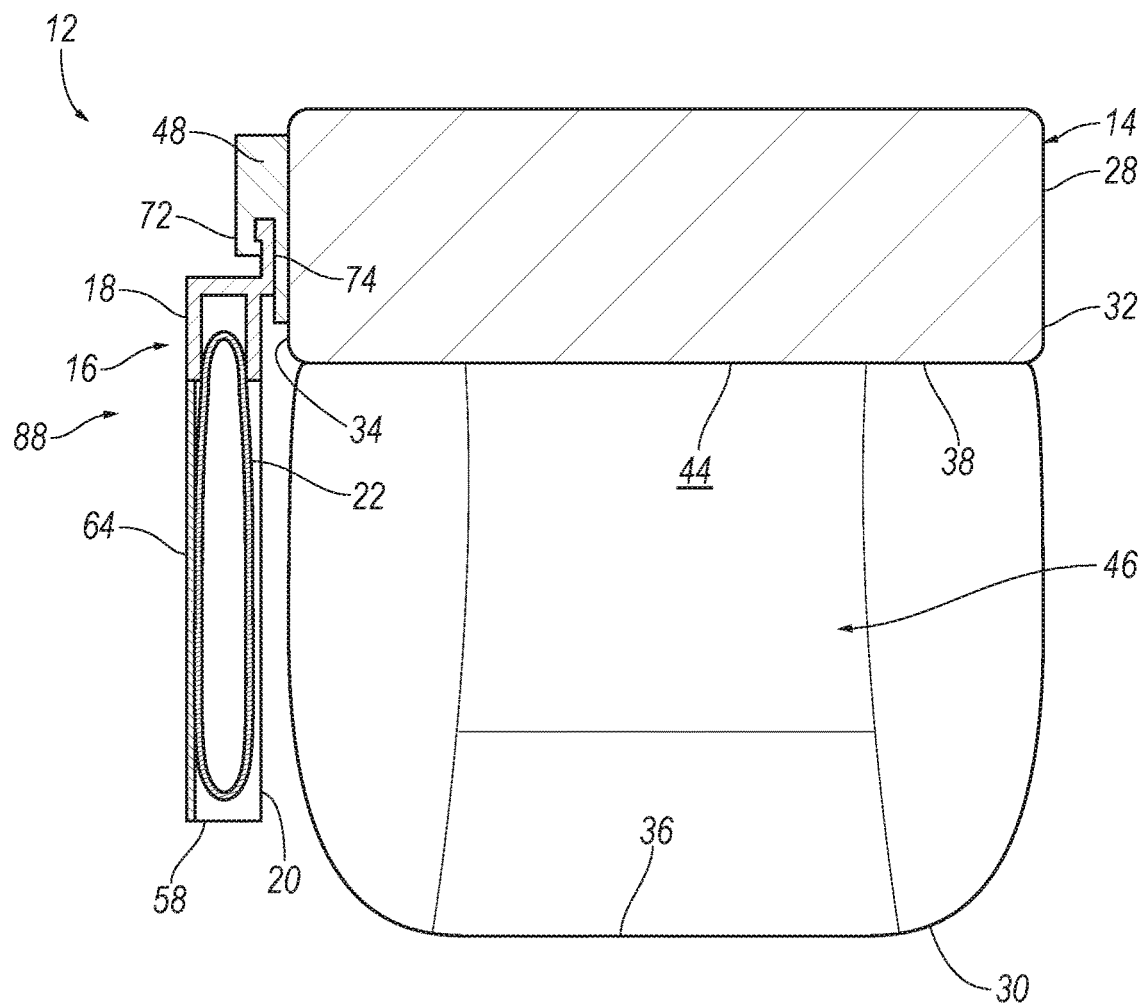
FIG. 6 is a cross-sectional view along line 6 in FIG. 4B of the first arm and the seat being locked with each other in a fixed position.

With reference to FIG. 6, the first arm 18 and the seat 14 may lock with each other in a fixed position when the first arm 18 is in the deployed position. For example, the seat 14 may include a slot 72, and the first arm 18 may include a tongue 74 engageable with the slot 72. The slot 72 may, for example, be disposed on the side shield 48. For example, when the second arm 20 is mounted to the seat bottom 30, the slot 72 may be disposed on the side shield 48 between the first arm 18 in the undeployed position and the bottom 40 of the seatback 28. As another example, when the second arm 20 is mounted to the seatback 28, the slot 72 may be disposed on the side shield 48 between the first arm 18 in the undeployed position and the front end 36 of the seat bottom 30. Alternatively, the second arm 20 may be mounted to one of the seatback 28 or the seat bottom 30, and the slot 72 may be disposed on the other of the seatback 28 or the seat bottom 30.

The slot 72 and the tongue 74 are selectively engageable with each other from an unlocked position to a locked position. In the unlocked position, the slot 72 and the tongue 74 are spaced from each other, i.e., not engaged with each other. In this situation, the first arm 18 is rotatable relative to the seat 14, e.g., during deployment. In the locked position, the slot 72 and the tongue 74 are engaged with each other, i.e., fixed relative to each other. For example, the slot 72 and the tongue 74 may each include a ledge (not numbered) that partially overlap, e.g., along the lateral axis A of the seat 14, each other when the first arm 18 is in the deployed position. In other words, the slot 72 and the tongue 74 prevent the first arm 18 from moving relative to the seat 14. Said differently, the slot 72 and the tongue 74 lock the first arm 18 and the seat 14 with each other in the fixed position when the first arm 18 is in the deployed position.

Returning to FIGS. 4A and 5A, the side airbag assembly 88 may include a base 62 attached to the airbag housing 16 and supporting the airbag 22. The base 62 may be flat. As another example, the base 62 may include a cavity (not shown) that may house the airbag 22 in the uninflated position and may support the airbag 22 in the inflated position. The base 62 may, for example, include clips, panels, etc. for attaching the airbag 22 and for attaching the base 62 to the airbag housing 16.

The base 62 may be disposed between the first arm 18 and the second arm 20. That is, the base 62 may be covered by the airbag housing 16 when the first arm 18 is in the undeployed position. The base 62 may, for example, be attached to the first arm 18, as shown in FIG. 4A. That is, the base 62 may move as a unit with the first arm 18 when the first arm 18 rotates to the deployed position, i.e., when the airbag 22 inflates. In other words, the base 62 may move relative to the seat 14 when the airbag 22 inflates. As another example, the base 62 may be attached to the second arm 20, i.e., fixed relative to the seat 14, as shown in FIG. 5A.

The airbag 22 may be formed of any suitable airbag 22 material, e.g., from a woven polymer. For example, the airbag 22 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 22 may be a single continuous unit, e.g., a single piece of fabric. Alternatively, the airbag 22 may include a plurality of segments, i.e., two or more. The segments may be attached to each other in any suitable fashion, e.g., a plurality of panels attached by stitching, ultrasonic welding, etc.

As set forth above, the airbag 22 is inflatable from the uninflated position to the inflated position. In the uninflated position, the airbag 22 may be disposed in the airbag housing 16, e.g., between the first arm 18 and the second arm 20. In other words, the airbag housing 16 may cover the airbag 22 in the uninflated position. During inflation, the airbag 22 may force the first arm 18 to rotate relative to the seat 14 to the deployed position. In the inflated position, the airbag 22 extends along the occupant seating area 46, e.g., in the seat-forward direction D1 (as shown in FIG. 3) and along the vertical axis V of the seat 14 (as shown in FIG. 2), between the occupant seating area 46 and another seat 14, i.e., inboard of the occupant seating area 46. In the inflated position, the airbag 22 may extend next to the occupant seating area 46 to control occupant kinematics.

The airbag 22 extends from one of the first arm 18 or the second arm 20 in the inflated position. For example, when the second arm 20 is mounted to the seat bottom 30, the airbag 22 may extend from the first arm 18 along the occupant seating area 46 in the inflated position, as shown in FIGS. 2, 3 and 4B. In other words, the first arm 18 may support the airbag 22 in the inflated position. Alternatively, when the second arm 20 is mounted to the seatback 28, the airbag 22 may extend from the second arm 20 along the occupant seating area 46 in the inflated position, as shown in FIG. 5B. In other words, the second arm 20 may support the airbag 22 in the inflated position. The airbag 22 may be disposed adjacent to the seatback 28 and the seat bottom 30 in the inflated position.

As set forth above, the airbag 22 is attached to one of the first arm 18 or the second arm 20. For example, when the second arm 20 is mounted to the seat bottom 30, the airbag 22 may be attached to the first arm 18, as shown in FIG. 4B. When the airbag 22 is attached to the first arm 18, the airbag 22 moves with the first arm 18 when the first arm 18 rotates to the deployed position. In such an example, the airbag 22 in the inflated position may be spaced from the second arm 20, as shown in FIGS. 2 and 3. As another example, when the second arm 20 is mounted to the seatback 28, the airbag 22 may be attached to the second arm 20, as shown in FIG. 5B. When the airbag 22 is attached to the second arm 20, the airbag 22 moves relative to the first arm 18 when the first arm 18 rotates to the deployed position. In such an example, the airbag 22 in the inflated position may be spaced from the first arm 18. The airbag 22 may, for example, be attached to the one of the first arm 18 or the second arm 20 via stitching, ultrasonic welding, etc.

The side airbag assembly 88 may include a panel 64 disposed outboard of the airbag 22 relative to the seat 14. That is, the airbag 22 may be disposed between the inboard side 34 of the seat 14 and the panel 64, as shown in FIGS. 2, 3, 4B, and 5B. The panel 64 may extend from the first arm 18 to the second arm 20, as shown in FIGS. 3, 4B, and 5B. The panel 64 may be attached to the first arm 18 and the second arm 20, e.g., via stitching, ultrasonic welding, etc. The panel 64 may be referred to as a "sail". The panel 64 is a sheet. Specifically, the panel is relatively thin.

The panel 64 may be uninflatable. In other words, the panel 64 may not define an inflation chamber, e.g., the panel 64 may be a panel of material that is not fixed to another panel, or itself, to enclose a volume for receiving inflation medium. The panel 64 may be a woven fabric, a solid polymeric sheet, or any other suitable material.

With reference to FIGS. 3, 4B, and 5B, the panel 64 may include a first side 66 extending along the first arm 18. The first side 66 may extend from the second arm 20 towards the distal end 54 of the first arm 18. The first side 66 may extend any suitable amount towards the distal end 54 of the first arm 18. For example, the first side 66 may extend to the distal end 54 of the first arm 18. Alternatively, the first side 66 may be spaced from the distal end 54 of the first arm 18. The panel 64 may be attached to the first arm 18 along the first side 66.

The panel 64 may include a second side 68 extending along the second arm 20. In other words, the second side 68 extends transverse to the first side 66 when the first arm 18 is in the deployed position. The second side 68 may extend from the first arm 18 towards the distal end 58 of the second arm 20. The second side 68 may extend any suitable amount towards the distal end 58 of the second arm 20. For example, the second side 68 may extend to the distal end 58 of the second arm 20. Alternatively, the second side 68 may be spaced from the distal end 58 of the second arm 20. The panel 64 may be attached to the second arm 20 along the second side 68.

The panel 64 may include a third side 70 extending from the first side 66 to the second side 68. In other words, the third side 70 extends transverse to both the first side 66 and the second side 68. The third side of the panel 64 is moveable relative to the first and second sides 66, 68 of the panel 64. For example, the third side may move about the rotational axis R during deployment of the first arm 18. That is, the first arm 18 may pull the third side 70 as the first arm 18 rotates to the deployed position.

The panel 64 may be under tension when the first arm 18 is in the deployed position. In other words, the panel 64 may be taught, i.e., not relaxed, when the first arm 18 is in the deployed position. By tensioning the panel 64, the panel 64 may be a reaction surface for the airbag 22. That is, the panel 64 may provide a counteracting force against the airbag 22 when the airbag 22 is impacted by the occupant. In such an example, the panel 64 may provide lateral support for the airbag 22, which may assist the airbag 22 in controlling occupant kinematics.

The inflator 50 is in fluid communication with the airbag 22. The inflator 50 expands the airbag 22 with inflation medium, such as a gas, to move the airbag 22 from the uninflated position to the inflated position. The inflator 50 is supported by the airbag housing 16. For example, the inflator 50 may be attached to one of the first arm 18 and the second arm 20. For example, when the second arm 20 is mounted to the seat bottom 30, the inflator 50 may be attached to the second arm 20, as shown in FIG. 4A. As another example, when the second arm 20 is mounted to the seatback 28, the inflator 50 may be attached to the first arm 18, as shown in FIG. 5A. In other words, the airbag 22 may be attached to one of the first arm 18 or the second arm 20, and the inflator 50 may be attached to the other of the first arm 18 or the second arm 20. The inflator 50 may be disposed in the airbag housing 16, i.e., between the first arm 18 in the undeployed position and the second arm 20.

The inflator 50 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 50 may be, for example, at least partially in an inflation chamber of the airbag 22 to deliver inflation medium directly to the inflation chamber or may be connected to the inflation chamber through fill tubes, diffusers, etc.

Figure 7:
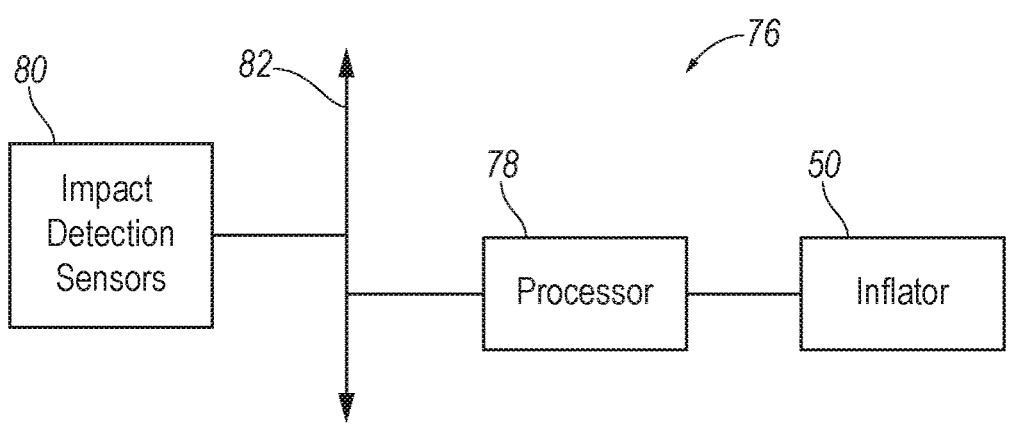
FIG. 7 is a block diagram of an inflation system of the vehicle.

With reference to FIG. 7, the vehicle 10 may include an inflation system 76 having a computer. The computer may be a microprocessor-based computing device implemented via circuits, chips, or other electronic components. For example, the computer may include a processor 78, memory, etc. The memory may store instructions executable by the processor 78 and the processor 78 may read the instructions from the memory and execute the instructions. The processor 78 may be programmed to initiate an inflation of the airbag 22 in response to the vehicle impact.

The vehicle 10 may include impact detection sensors 80 programmed to detect the vehicle impact to the vehicle 10. The impact detection sensors 80 may be disposed in the vehicle 10. The impact detection sensors 80 may be of various types, e.g., pressure sensor, acceleration sensor, vision sensor, etc. When the vehicle impact occurs, the processor 78 may receive one or more signals from the impact detection sensors 80 indicating the vehicle impact. In response to receiving the signals from the impact detection sensors 80, the processor 78 may initiate the inflation of the airbag 22. Alternatively, the processor 78 may initiate the inflation of the airbag 22 selectively based on information from the impact detection sensors 80 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats 14 sensing the occupancy status of the seats 14.

In order to receive the signals from the sensors, e.g., the impact detection sensors 80, and to initiate the inflation of the airbag 22, the processor 78 communicates with the sensors, e.g., the impact detection sensors 80, and the inflator 50, e.g., through a direct electrical wiring, through which an analog or a digital signal is transmitted, or through a communication network 82 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 22 is in the uninflated position, under normal operating conditions of the vehicle 10. In the event of a vehicle impact, the impact detection sensors 80 detect the impact. The impact detection sensors 80 transmit a signal indicating the vehicle impact collision through the communication network 86 to the processor 78. When the vehicle impact is detected, the processor 78 transmits a signal through the communication network 86 triggering the inflator 50 to inflate the airbag 22 with inflation medium from the uninflated position to the inflated position. When the inflator 50 inflates the airbag 22 to the inflated position, the inflation medium flows into the inflation chamber of the airbag 22, increasing the pressure in the inflation chamber. As the pressure is increased in the inflation chamber, the airbag 22 breaks the weakened joint 60 and the first arm 18 rotates to the deployed position. As the occupant moves relative to the seat 14 due to momentum of the vehicle impact, the occupant moves towards the airbag 22 in the inflated position. When the occupant impacts the airbag 22, the airbag 22 controls the kinematics of the occupant. By being attached to one of the first arm 18 or the second arm 20, the airbag 22 controls the kinematics of the occupant regardless of whether another component is adjacent to the seat 14 to provide a reaction surface for the airbag 22.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
   a seat defining a lateral axis;
   an airbag housing supported by the seat, the airbag housing including a first arm and a second arm;
   the first arm being rotatable relative to the seat about a rotational axis generally parallel to the lateral axis and the second arm being fixed relative to the seat; and
   an airbag disposed between the first arm and the second arm, the airbag being attached to one of the first arm or the second arm.

2. The restraint system of claim 1, further comprising a panel extending from the first arm to the second arm when the airbag is in an inflated position.

3. The restraint system of claim 2, wherein the airbag in the inflated position is disposed between the panel and the seat.

4. The restraint system of claim 2, wherein the panel is attached to the first arm and the second arm, the panel being under tension between the first and second arms when the airbag is in the inflated position.

5. The restraint system of claim 2, wherein the panel is a reaction surface for the airbag in the inflated position.

6. The restraint system of claim 2, wherein the panel is fabric.

7. The restraint system of claim 2, wherein the panel is uninflatable.

8. The restraint system of claim 1, wherein the airbag includes a base attached to the first arm to move as a unit with the first arm.

9. The restraint system of claim 1, wherein the first arm and the second arm are connected to each other along a weakened joint spaced from the rotational axis.

10. The restraint system of claim 9, wherein the weakened joint is designed to break when the airbag is inflated.

11. The restraint system of claim 1, wherein the first arm is rotatable from an undeployed position to a deployed position as a result of the airbag inflating.

12. The restraint system of claim 11, wherein the first arm extends along the second arm in the undeployed position, and the first arm extends transverse to the second arm in the deployed position.

13. The restraint system of claim 11, wherein the first arm and the seat lock with each other in a fixed position when the first arm is in the deployed position.

14. The restraint system of claim 13, wherein the first arm includes a tongue and the seat includes a slot, the tongue of the first arm being disposed in the slot of the seat when the first arm and the seat are locked with each other in the fixed position.

15. The restraint system of claim 14, wherein the seat includes a seat bottom, a seatback supported by the seat bottom, and a side shield extending along the seatback and the seat bottom, the slot is disposed on the side shield.

16. The restraint system of claim 1, further comprising an inflator in fluid communication with the airbag, the inflator is fixed to the second arm of the housing.

17. The restraint system of claim 1, wherein the seat includes a seatback defining an occupant seating area, the airbag and the first arm being adjacent the seatback when the airbag is in an inflated position and the airbag extends from the first arm along the occupant seating area in the inflated position.

18. The restraint system of claim 1, wherein the airbag in an inflated position is spaced from the other of the first arm or the second arm.

19. The restraint system of claim 1, wherein the seat includes a seat bottom and a seatback supported by the seat bottom, the second arm is fixed to one of the seatback or the seat bottom.

* * * * *